(12) United States Patent
Hollingsworth et al.

(10) Patent No.: US 6,289,575 B1
(45) Date of Patent: Sep. 18, 2001

(54) METHOD OF MANUFACTURING A STACKED STATOR ASSEMBLY FOR A LINEAR MOTOR

(75) Inventors: Philip Hollingsworth, La Jolla; James Carl Ellard; Paul M. Lindberg, both of San Diego, all of CA (US)

(73) Assignee: California Linear Devices, Inc., Carlsbad, CA (US)

( * ) Notice: Subject to any disclaimer, the term of this patent is extended or adjusted under 35 U.S.C. 154(b) by 0 days.

(21) Appl. No.: 09/457,611

(22) Filed: Dec. 8, 1999

(51) Int. Cl.⁷ .......................... H02K 15/00; H02K 15/14; H02K 15/16
(52) U.S. Cl. ................. 29/596; 29/423; 29/426.1; 29/426.2; 29/426.3; 29/428; 29/596
(58) Field of Search .......................... 29/596, 423, 426.1, 29/426.2, 426.3, 428

(56) References Cited

U.S. PATENT DOCUMENTS

| | | | | |
|---|---|---|---|---|
| 4,215,283 | * | 7/1980 | Hinds | 310/14 |
| 4,335,338 | * | 6/1982 | Sawyer | 318/135 |
| 4,542,311 | * | 9/1985 | Newman | 310/13 |
| 4,810,914 | * | 3/1989 | Karidis | 310/12 |
| 5,357,779 | * | 10/1994 | Hahn | 72/347 |
| 5,440,183 | * | 8/1995 | Denne | 310/12 |
| 5,691,582 | * | 11/1997 | Lucas | 310/14 |
| 5,729,067 | * | 3/1998 | Janutka | 310/135 |
| 5,734,209 | * | 3/1998 | Hallidy | 310/12 |
| 5,831,353 | * | 11/1998 | Bolding | 310/12 |
| 5,998,905 | * | 12/1999 | Fougere | 310/254 |
| 6,016,595 | * | 1/2000 | Dysarz | 29/423 |
| 6,199,257 | * | 3/2001 | Munk | 29/423 |

* cited by examiner

*Primary Examiner*—Lee Young
*Assistant Examiner*—Paul D Kim
(74) *Attorney, Agent, or Firm*—Luce, Forward, Hamilton & Scripps LLP

(57) ABSTRACT

A stator assembly has a pair of end holes leading to a hollow region which has a larger diameter than the end holes. The assembly is manufactured around an elongated pole having a diameter equal to the end holes, which is surrounded by a temporary sleeve whose thickness fills the gap between the pole and the inner wall of the hollow region. The pieces of the assembly are placed onto the pole such that the sleeve lies within the hollow region, to thereby align them correctly with one another. After the pieces are secured to each other, the pole is removed, leaving the sleeve within the hollow region, and then the sleeve is removed. The sleeve may be flexible in order to expedite its removal from the hollow, and also may be of a magnetic material that is kept in place by magnetic forces generated by the stator assembly or by the pole.

6 Claims, 3 Drawing Sheets

METHOD OF MANUFACTURING A STACKED STATOR ASSEMBLY FOR A LINEAR MOTOR

FIELD OF THE INVENTION

The present invention is directed to a method of manufacturing a stacked stator assembly for a linear motor, and to an apparatus for implementing the method.

BACKGROUND OF THE INVENTION

A linear motor has two main mechanical components, a shaft (or "rotor") and a stator. The shaft moves reciprocally into and out of the stator due to magnetic forces imposed by magnets and/or coils that lie in the shaft and/or stator.

BRIEF SUMMARY OF THE INVENTION

The inventor of the present invention has discovered an effective and inexpensive way to manufacture the stator from individual pieces. According to the embodiments of the present invention, the pieces are assembled around a removable form.

It is therefore an object of the present invention to provide a method of manufacturing a stacked stator assembly for a linear motor using a removable form, and an apparatus for implementing the method.

A broader object of the present invention is to provide a method of manufacturing a device which has at least one end hole leading to a larger hollow, using a removable form, and an apparatus for implementing the method.

These and other objects are achieved by providing a form for assembling a device, the device after assembly having a hollow and at least one end hole leading to the hollow, said form comprising an elongated member having a length extending from the end hole into the hollow, and being retractable from said hollow through the end hole; and a flexible member for occupying a space between a side of said elongated member and an inner wall of the hollow.

These and other objects are also achieved by providing a method for manufacturing a device from a plurality of parts, the parts when assembled defining an interior hollow and at least one end hole leading to the hollow, said method comprising (a) providing an elongated member having a length extending from the end hole into the hollow, and a flexible member for occupying a space between a side of the elongated member and an inner wall of the hollow; (b) placing the plurality of parts onto the elongated member and flexible member such that the flexible member occupies the space between the side of the elongated member and the inner wall of the hollow; (c) removing, subsequent to said steps (a) and (b), the elongated member from the hollow, leaving the flexible member within the hollow; and (d) removing, subsequent to said step (c), the flexible member from the hollow.

Further scope of applicability of the present invention will become apparent from a review of the detailed description and accompanying drawings. It should be understood that the description and examples, while indicating preferred embodiments of the present invention, are not intended to limit the breadth of the invention since various changes and modifications within the spirit and scope of the invention will become apparent to those skilled in the art.

BRIEF DESCRIPTION OF THE DRAWINGS

The present invention will become more fully understood from the detailed description given below, together with the accompanying drawings which are given by way of illustration only, and thus are not to be construed as limiting the scope of the present invention. In the drawings.

DETAILED DESCRIPTION OF THE PREFERRED EMBODIMENTS

Figure 1:
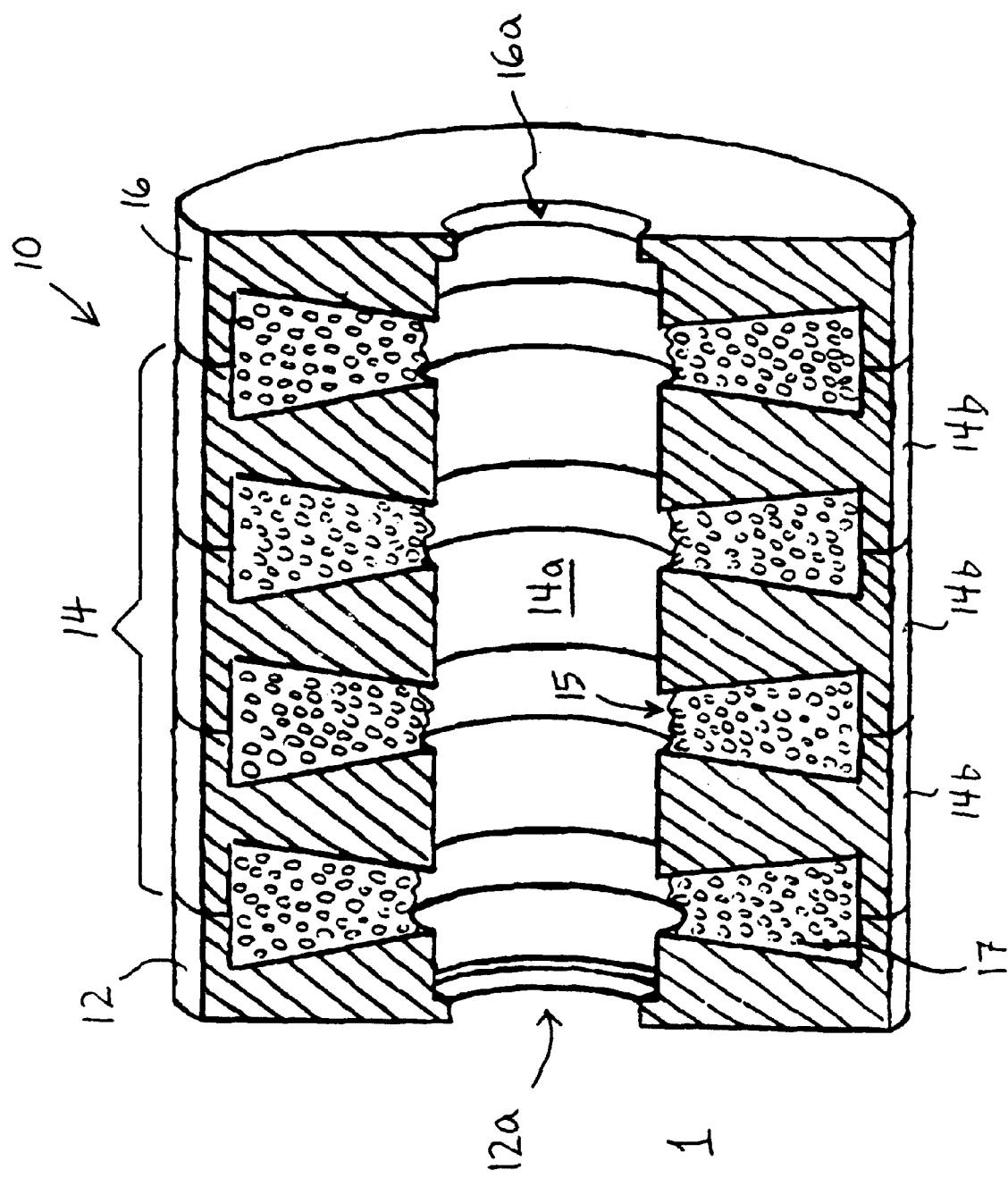
FIG. 1 shows an assembled stator for a linear motor.

FIG. 1 shows a general illustration of a fully assembled stator 10 for a linear motor. In use, a shaft (not shown) passes back and forth through the interior of the shaft in response to magnetic fields generated by and/or acting on the stator and the shaft. The stator 10 includes end pieces 12, 16 on either end of a tube 14. End pieces 12, 16 are fixed to the tube by glue, bolts, or any other means, and have respective holes 12a, 16a through which the shaft will pass. The holes 12a, 16a have substantially the same diameter as the shaft, and lead to the interior hollow 14a of tube 14. The tube 14 is formed from two or more individual stator assembly pieces 14b which are glued or bolted together, preferably with wire coils 17 interleaved between them. The number of pieces 14b shown in FIG. 1 is merely exemplary, as the stator may have fewer or more than the four coils 17 shown. In one embodiment there are thirteen. Slots or discontinuities 15 exist between adjacent pieces 14b along the length of the interior wall of the tube, where the wire coils 17 are located.

The interior 14a of tube 14 is a cylindrical hollow of constant diameter along the length thereof, with the diameter at the slots 15 being equal to or greater than that constant diameter. Holes 12a, 16a are also circular, but smaller in diameter than the interior hollow 14a. For optimal operation of the linear motor, the respective interior hollows of pieces 14b must be aligned concentrically, and very accurately with respect to one another. They must also be aligned concentrically and very accurately with respect to the holes 12a, 16a.

The tube 14 can be assembled by first slipping the individual pieces 14b over a pole having a cylindrical outer wall that is of the same diameter as the hollow 14a. The pole becomes a form that is used to align the pieces 14b with respect to one another, after which they are glued or bolted together and the pole removed. However, it is impossible to use the same pole to simultaneously align and mount the end pieces 12, 16 to the pieces 14b because the diameters of the holes 12a, 16a are smaller than that of the pole.

Figure 2:
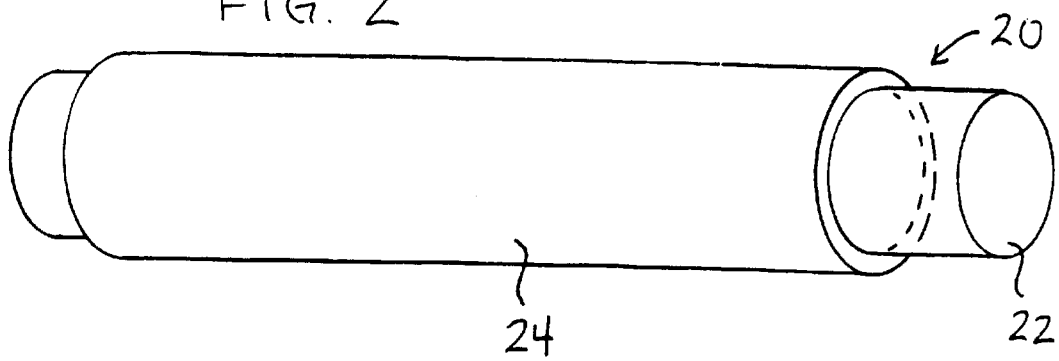
FIG. 2 illustrates a form used in a preferred embodiment of the present invention to manufacture the stator of FIG. 1.

FIG. 2 shows an embodiment of the present invention in which a form 20 includes a generally cylindrical pole 22 or other elongated member surrounded by a flexible member 24. The pole can be any hollow or solid material, such as metal, wood, hard plastic, ceramic, etc., but more rigid and non-magnetic metals or materials are preferred. Flexible member 24 is essentially a temporary sleeve used in the manufacturing process. It is preferably made of a flexible material such as plastic, and preferably has a relatively low coefficient of friction (it is slippery). A lubricant can be applied to one or both sides of the flexible member 24 if needed, and may give the added benefit of helping to stick the flexible member 24 in place against the side of the pole 22. It can be a single cylindrical sleeve or composed of a plurality of strips.

Figure 3A:
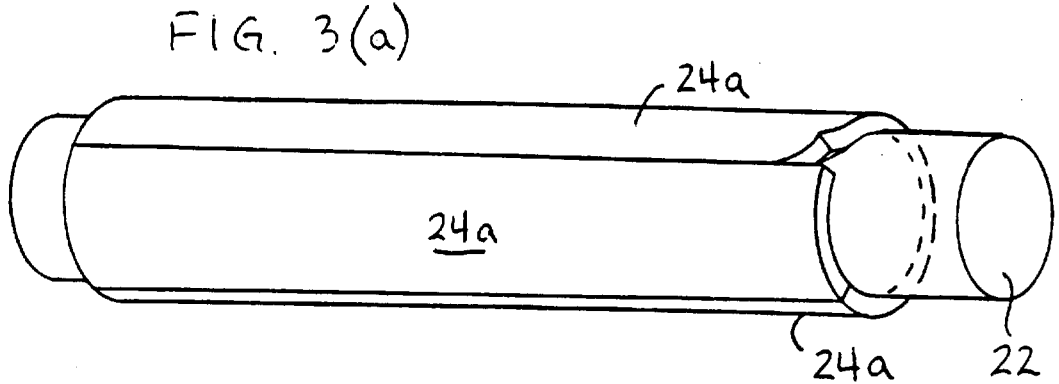
FIGS. 3(a) and 3(b) show additional embodiments of the form according to the present invention.

In the embodiment of FIG. 3(a), the flexible member 24 includes a plurality of individual adjacent strips 24a, each extending axially along the pole 22. The strips 24a can have the same or dissimilar widths, and the number of strips can be two or more, depending on the flexibility of the material and the physical size of the stator being manufactured.

Figure 3B:
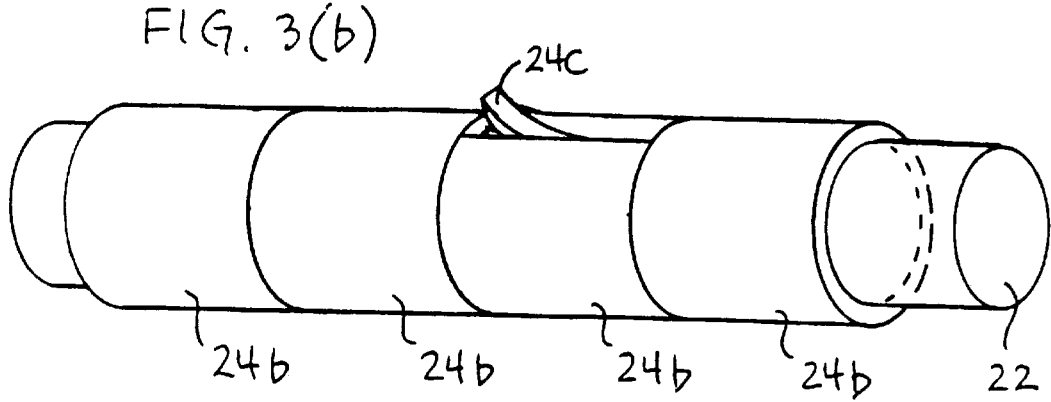

In the embodiment of FIG. 3(b), the flexible member 24 is made of a plurality of adjacent strips 24b each disposed circumferentially around the pole 22. The strips 24b can be continuous loops or linear segments whose ends 24c touch or almost touch. In yet another embodiment (not shown) the flexible member can be composed of one or more strips disposed helically around the pole 22.

The flexible member 24 preferably has a length commensurate with the length of hollow 14a. Its thickness should be substantially equal to the gap that would exist between the pole 22 and the surface of hollow 14a, which may be on the order of about a millimeter or so depending on the size of the motor being built. It is most preferable that the flexible member 24 not be compressible.

The process of manufacturing the stacked stator assembly according to an embodiment of the present invention begins as follows. The pole 22 is inserted through the hole in a first one of end pieces 12, 16, and the flexible member 20 is placed around the pole 22. The artisan will appreciate that the sequence of these initial steps does not really matter.

Each of the stator pieces 14b and coils 17 are then alternately slipped over the pole and flexible member. Because the diameter of the pole plus the thickness of the flexible member equals the diameter of the hollow 14a, the pieces 14b fit snugly and are properly aligned. Finally, the other one of the end pieces 12, 16 is placed over the pole 22. Because the length of flexible member 24 is preferably the same as, or almost the same as the desired length of hollow 14a, the second end piece will not be disturbed by the presence of the flexible member 24. At this point, the flexible member is within the hollow, and the pole 22 extends from both end holes 12a, 16a.

When the components of the assembly are in place, glue, bolts, or other means are used to secure the stator assembly together, optionally with the assistance of a vice. Once secured, the pole 22 is slipped out from the assembly. The low coefficient of friction of the flexible member 24 combined with the interior edge of the hole 12a or 16a allows the pole 22 to slide out while leaving the flexible member behind. Once the pole 22 is no longer in the hollow 14a, the flexible member either collapses and can be removed, or can be peeled from the surface of the hollow 14a using pincers or some other tool.

In one embodiment, the flexible member 24 is made entirely or partially of magnetic material such as #1010 steel shimstock, but it can also be of the type which is often used in the home to stick notes against a refrigerator door although the latter type may be found to be too soft. The coils 17 of this embodiment are energized in order to create a magnetic field which keeps the flexible member (or the individual strips which constitute the flexible member) in place against the interior wall of the hollow 14a. The coils may be energized as soon as they are slipped into place, or after all of the components are assembled over the tube and flexible member. Once the glue or bolts are secured, the pole 22 is slipped out from the assembly, leaving the flexible member 24 still held magnetically against the wall of the hollow. Once the pole 22 is no longer in the hollow 14a, the coils can be de-energized and the flexible member 24 removed. The artisan will recognize that the pole 22 can contain magnetizing elements to keep the flexible member in place against the pole 22 during the assembly process instead of or as a supplement to the coils 17. Alternatively, the tube 14 can be assembled first (either temporarily or permanently) and energized to create the field, then the flexible member (or its strips) secured against the side wall that will define the hollow 14a, and then the pole inserted through the tube 14 in order to align one or both end pieces 12, 16.

Figure 4:
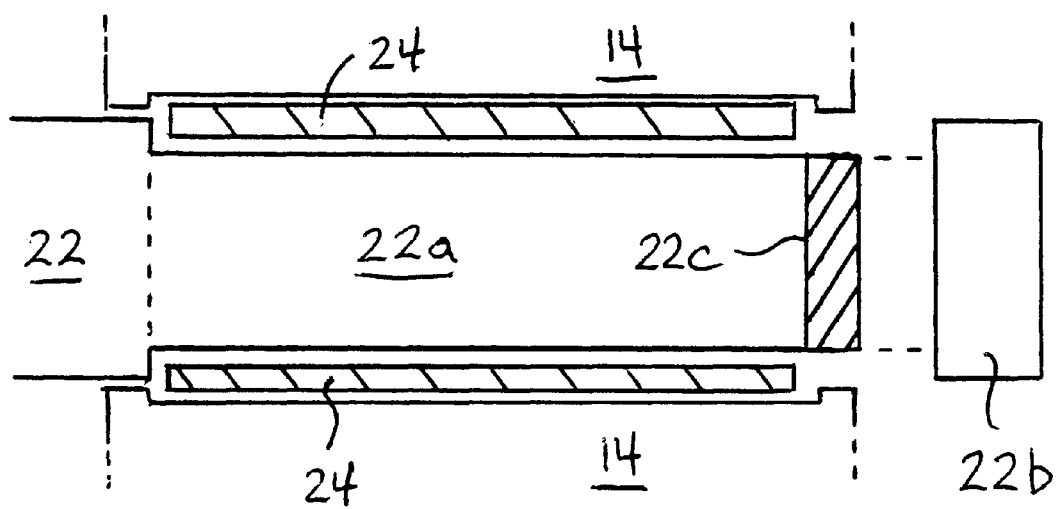
FIG. 4 shows a cross-sectional view of another embodiment of the present invention.

The versatility of the present invention permits it to be varied in many ways. For example, pole 22 can have a slightly smaller diameter over the length of the hollow 14a than its diameter at one or both of the holes 12a, 16a in order to create a recess for setting the flexible member in its proper place (this would require a slightly thicker flexible member 24 in order to accommodate the increased distance between the outer wall of the pole 22 and the inner wall of the hollow 14a). With reference to FIG. 4, a segment 22a of the pole 22 has a reduced diameter relative to the diameter at one or both of its ends. In order to withdraw the pole 22 and the flexible member 24 from the tube 14, a removable cap 22b is provided on one or both ends of the segment 22a. The cap 22b has an outer diameter that is preferably of the size needed to align the corresponding end piece 12 or 16. The cap 22b can be friction-fit onto the end of the segment 22a, or it can be secured by a screw-thread connection 22c or set of detents (not shown).

The term "cap" is intended broadly to encompass closed-ended caps as well as ring-like collars which slide, screw, or otherwise mate with the segment 22b. Moreover, the cap 22b can include a smaller-diameter segment similar to segment 22a, which mates with segment 22a within the hollow 14a. The artisan will appreciate, however, that the need for a cap 22b depends on the shape of the tube 14 being constructed.

The shape of the hollow 14a, holes 12a, 16a, and/or pole 22 can take on other than circular or cylindrical shapes—the present invention is well suited for assembling any device having an interior hollow whose inner wall is deeper, in a sideways dimension, than at least one region of an end hole leading to the hollow, i.e., a hole and hollow that create a "corner" around which a rigid element cannot go. In this regard, it should be recognized that certain embodiments of the present invention can be adapted to situations in which only one of the holes 12a, 16a exists. The tube 14 can be made of a single piece rather than a plurality of separate pieces 14b, and it (or one of the pieces 14b) can be integrated with one of the end pieces 12, 16. Each piece 14b itself can be made of separate components. Slots or discontinuities 15 also need not be present.

In alternative embodiments, the flexible member 24 need not have a constant thickness, and can be longer than the hollow 14a, in which case the pole 22 should have a diameter smaller than the diameter of the holes 12a, 16a, with the thickness of flexible member 24 at the holes 12a, 16a making up the difference. The flexible member also need wrap around the entire circumference of pole 22 if an edge of the hole is flush with part of the side wall of the hollow.

The invention having been thus described, it will be obvious that the same may be varied in many ways, not only in construction but also in application. For example, the invention is suitable for manual or automated manufacture, and the flexible member can be composed of a plurality of separate concentric layers. The flexible member can alternatively be made of a plurality of rigid members such as metal, ceramic, etc., so long as they are sized sufficiently small to be withdrawn through the end holes. Such variations are not to be regarded as a departure from the spirit and scope of the invention, but rather as modifications intended to be encompassed within the scope of the following claims.

What is claimed is:

1. A method for manufacturing a device from a plurality of parts, the parts when assembled defining an interior hollow and at least one end hole leading to the hollow, said method comprising:

(a) providing an elongated member and a flexible member for occupying a space between a side of the elongated member and an inner wall of the hollow;

(b) placing the plurality of parts onto the elongated member and flexible member such that the flexible member occupies the space between the side of the elongated member and the inner wall of the hollow;

(c) removing, subsequent to said steps (a) and (b), the elongated member from the hollow, leaving the flexible member within the hollow; and (d) removing, subsequent to said step (c), the flexible member from the hollow.

2. The method of claim 1, wherein the end hole is generally circular and the hollow is generally cylindrical and concentric with the end hole, the device is a stacked stator assembly including at least one end piece having the end hole and at least one stator assembly piece having the inner wall of the hollow, and further wherein the elongated member is a cylindrical pole having a diameter substantially equal to the diameter of the end hole, and the flexible member is a cylindrical sleeve having a thickness substantially equal to one-half of the difference between the diameter of the hollow and the diameter of the pole.

3. The method of claim 1, wherein at least a first one of the parts has the inner wall of the hollow, and a second one of the parts has the end hole, said step (b) including the steps of:

placing the first part onto the elongated member and flexible member such that the inner wall contacts the flexible member; and placing the second part onto the elongated member such that the end hole contacts the side wall of the elongated member.

4. The method of claim 1, wherein at least a first one of the parts has the inner wall of the hollow, and said step (b) includes:

(e) securing the flexible member against the first part;

(f) placing, after said step (e) the first part and flexible member onto the elongated member.

5. The method of claim 4, wherein the flexible member includes magnetic material, and said step (e) includes generating a magnetic field from the first part such that the flexible member is attracted to the first part.

6. The method of claim 4, wherein a second one of the parts has the end hole, the elongated member has a diameter substantially equal to a diameter of the end hole, and said step (b) further includes:

(g) placing the second one of the parts onto the elongated member such that the end hole contacts the elongated member.

* * * * *